(12) United States Patent
Ahner et al.

(10) Patent No.: US 7,638,211 B2
(45) Date of Patent: Dec. 29, 2009

(54) MASS STORAGE APPARATUS USING FLUORINE MEDIATED SELF-ASSEMBLY MONOLAYERS OF NANOPARTICLES RECORDING MEDIUM

(75) Inventors: Joachim Walter Ahner, Pittsburgh, PA (US); Nisha Shukla, Pittsburgh, PA (US); Dieter Weller, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 530 days.

(21) Appl. No.: 11/055,004

(22) Filed: Feb. 9, 2005

(65) Prior Publication Data

US 2006/0177705 A1 Aug. 10, 2006

(51) Int. Cl.
*G11B 5/66* (2006.01)
(52) U.S. Cl. .......................... 428/832; 427/131
(58) Field of Classification Search ............. 428/839.4, 428/842.2, 832.4, 832
See application file for complete search history.

(56) References Cited

U.S. PATENT DOCUMENTS

| 4,070,189 | A * | 1/1978 | Kelley et al. ............. 430/527 |
| 6,331,364 | B1 * | 12/2001 | Baglin et al. ............ 428/830 |
| 6,884,328 | B2 * | 4/2005 | Litvinov et al. ......... 204/192.2 |
| 7,108,927 | B2 * | 9/2006 | Hattori et al. ........... 428/832.4 |
| 7,220,482 | B2 * | 5/2007 | Mino et al. ............. 428/403 |

OTHER PUBLICATIONS

Nisha Shukla, "Dip-coating of FePt nanoparticle films: surfactant effects", Elsevier Science, 2001, 2 pgs.
Shishou Kang, "Synthesis, Self-Assembly, and Magnetic Properties of [FePt]1-xAux Nanoparticles", IEEE Transactions on Magnetics, vol. 39, No. 5, Sep. 2003, pp. 2753-2757.
Hao Zeng, "Interparticle Interactions in Annealed FePt Nanoparticle Assemblies", IEEE Transactions on Magnetics, vol. 38, No. 5, Sep. 2002, pp. 2598-2600.
Katsuyuki Naito, "2.5-Inch Disk Patterned Media Prepared by an Artificially Assisted Self-Assembling Method", IEEE Transactions on Magnetics, vol. 38, No. 5, Sep. 2002, pp. 1949-1951.
Victor F. Puntes, "Synthesis, Structural Order & Magnetic Behavior of Self-Assembled E-Co Nanocrystal Arrays", IEEE Transactions on Magnetics, vol. 37, No. 4, Jul. 2001, pp. 2210-2212.

(Continued)

*Primary Examiner*—Holly Rickman
(74) *Attorney, Agent, or Firm*—Westman, Champlin & Kelly, P.A.

(57) ABSTRACT

A magnetic recording medium for high-density recording, having a doped interlayer to preserve the uniformity and ordering of the magnetic nanoparticles in its recording layer. The interlayer is doped with a high electronegativity material. The dopant atoms in the interlayer interact with the ferromagnetic nanoparticles to promote the formation of a homogeneous, ordered monolayer of nanoparticles in the recording layer. In addition, the high electronegative property of the dopant atoms holds the nanoparticles in place during the subsequent annealing process to prevent sintering and disordering damage. In one embodiment, the dopant is a halogen or non-halogen material having a high electronegativity, which is not polymerized to the matrix material in the interlayer. The matrix material may be polymerized. An example of a doped interlayer is a fluorinated carbon film.

11 Claims, 3 Drawing Sheets

OTHER PUBLICATIONS

Roy Carey, "A Self-Forming Nanocrystallite Cobalt Recording Medium", IEEE Transactions on Magnetics, vol. 36, No. 5, Sep. 2000, pp. 3012-3014.

Barnaby Warne, Self Assembled Nanoparticulate Co : Pt for Data Storage Applications, IEEE Transactions on Magnetics, vol. 36, No. 5, Sep. 2000, pp. 3009-3011.

* cited by examiner

MASS STORAGE APPARATUS USING FLUORINE MEDIATED SELF-ASSEMBLY MONOLAYERS OF NANOPARTICLES RECORDING MEDIUM

FIELD OF INVENTION

This invention relates to a mass storage apparatus, and in particular relates to a storage device that uses a doped interlayer for the mediation of magnetic recording nanoparticles in the recording medium.

BACKGROUND OF THE INVENTION

There are many forms of mass storage technology used in modern computing. One of the prevailing forms of data recording is magnetic data recording due to its large storage capacity and re-usable recording media. Magnetic data recording may be implemented by employing different types of magnetic recording media, including tapes, hard discs, floppy discs, etc. Over the years, significant developments have been made to increase the areal data recording density in magnetic data recording to raise its capacity.

One approach for increasing the areal density of high capacity magnetic recording devices is to decrease the size of individual magnetic particles (grains) in the magnetic recording layer. In general, smaller magnetic grains are required to reduce the intrinsic media noise and to obtain a higher signal-to-noise ratio during the data reading process. However, if the magnetic grain size is too small (diameter less than approximately 8-10 nm), thermal excitation will perturb the magnetization of the magnetic grain and cause instability in the magnetization. This is known as superparamagnetic instability and may render today's commonly used cobalt-alloy based recording media unsuitable for archival data storage purposes. In perpendicular recording media, the grain magnetization is oriented perpendicular to the disk surface. By utilizing a soft magnetic underlayer and a single pole write head more efficient magnetic flux flow is achieved, thus enabling smaller grains to be kept thermally stable than is possible in longitudinal recording.

One approach toward reducing the grain volume V while avoiding superparamagnetic instability is to use a magnetic material with a high magnetic crystalline anisotropy energy density $K_u$. A promising material with high $K_u$ and good chemical stability is iron-platinum (FePt), and in particular $L1_0$ crystalline FePt nanoparticles. It has been proposed that $L1_0$ crystalline FePt nanoparticles (dia<5 nm) may be used to create an ultra-thin magnetic recording layer with very small grain volumes. Therefore, FePt nanoparticles have the potential to act as the recording media for high-density data recording of 1 Terabit/in and beyond.

It has been disclosed that an ultra-thin layer of FePt nanoparticles can be deposited onto a substrate by dip-coating the substrate in a solution made up of FePt nanoparticles, a non-polar solvent and excess surfactant. Creating a uniform (equal spatial distribution) and well-ordered (constant lattice structure) layer of FePt nanoparticles through dip-coating remains difficult. High data density recording media require the FePt nanoparticles to self-assemble into uniform ordered arrays across the substrate surface on length scales of several centimeters. Current nanoparticle deposition methods on solid surfaces show self-assembly in an organized monolayer only on length scales of several micrometers. Large-scale uniformity has currently been achieved in bilayer and multilayer deposition, but without the necessary long-range ordering.

Further details of FePt nanoparticles deposition through dip-coating may be referred from the technical paper by N. Shukla, J. Ahner, and D. Weller, "Dip-coating of FePt Nanoparticles Films: Surfactant Effects", Journal of Magnetism and Magnetic Materials, Vol. 272-276 (2004) 1349, which is incorporated by reference as if fully set forth herein.

Another challenge with using FePt nanoparticles is that they require a subsequent annealing at a temperature range of 500° C. to 750° C. in order to convert their crystalline structure from a non-magnetic face-centered cubic structure to a magnetic face-centered tetragonal structure. When FePt nanoparticles are exposed to this high temperature, the thermal energy will permit the nanoparticles to clump together (coalesce) and form much larger particles resulting in a loss of uniformity. This uniformity loss due to thermal energy is known as sintering damage and it appears more frequently when the nanoparticles are deposited as a bilayer or a multilayer. One approach that may reduce such damage from sintering is to deposit the FePt nanoparticles as an organized monolayer. However, when a FePt nanoparticle monolayer is exposed to the high temperature of the annealing process, it may experience a loss of self-assembly which will result in poor magnetic properties.

Accordingly, it would be desirable to develop a high capacity recording layer for a mass storage apparatus, which can take full advantage of FePt nanoparticles in a structure that can withstand the annealing process without experiencing sintering or loss of self-assembly problems.

SUMMARY OF THE INVENTION

The present invention provides a magnetic recording medium that is capable of achieving high-density recording through the use of a doped interlayer to preserve the uniformity and ordering of the magnetic nanoparticles in its recording layer. An interlayer comprising a matrix material and a dopant having high electronegativity is deposited onto a substrate. As used in the present disclosure, electronegativity generally refers to the affinity for electrons, which may be expressed as a measure of the tendency of an atom to attract an electron. Electronegativity is commonly measured on a Pauling scale. High electronegativity as used here generally refers to electronegativity greater than substantially 1.5 on the Pauling scale, and more specifically greater than substantially 2.5 on the Pauling scale.

Ferromagnetic nanoparticles are subsequently deposited onto the doped interlayer to form the recording layer. The dopant atoms in the interlayer interact with the ferromagnetic nanoparticles to promote the formation of a uniform, ordered monolayer of nanoparticles in the recording layer. In addition, the high electronegative property of the dopant atoms holds the nanoparticles in place during the subsequent annealing process to prevent sintering and disordering damage. The use of a doped interlayer in the recording medium provides thermal stability to the ordered layer of nanoparticles in the recording layer. A storage apparatus that uses a doped recording medium can be expected to achieve high-density recording on the order of 1 to 10 Terabits/$cm^2$.

In one embodiment, the interlayer comprises a halogen-doped or non-halogen-doped non-polymerized material having a high electronegativity, deposited on top of the soft underlayer. In another embodiment, the interlayer comprises a doped polymeric film having a high electronegativity. Yet in another embodiment, the dopant material used in the interlayer comprises fluorine (e.g., a fluorinated carbon interlayer with high electronegativity).

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention is directed to a mass recording medium that uses a doped interlayer to mediate the formation of a homogeneous, ordered monolayer of magnetic nanoparticles as its recording layer. As will be detailed below, the interlayer is comprised of a matrix that has been doped with a highly electronegative dopant to hold the nanoparticles in their places to preserve the uniformity and ordering of the recording layer. In addition, the doped interlayer also prevents the organized monolayer from damage from sintering and disordering that are associated with the annealing process.

By way of illustration and not limitation, the present invention will be described in connection with a magnetic recording disc drive system, and in particular a perpendicular magnetic recording disk drive system. Perpendicular magnetic recording, as used herein, generally refers to having the write pole of the recording head emit a magnetic flux that is substantially perpendicular to the direction of travel of the recording head and/or recording medium. Although the embodiments of the invention are described herein with reference to perpendicular magnetic recording, it will be appreciated that aspects of the invention may also be used in conjunction with other types of recording (e.g., longitudinal, heat-assisted magnetic recording) where it may be desirable to deploy the inventive magnetic recording medium.

It is well contemplated that the novel magnetic recording medium of the present invention may be applied to other types of magnetic data recording system, such as tape drives, floppy disc drives, etc., which may comprise in addition to magnetic data recording, other forms of data reading, such as magneto-optical recording system, without departing from the scope and spirit of the present invention. While the present invention is illustrated in reference to a magnetic media with ultra small grain size, it is contemplated that the novel recording medium may be used in a mixed environment where the grain size on other parts of the recording medium may be substantially different than the grain size achieved by the present invention, including the use of conventionally deposited films that may result in substantially larger grain size.

Figure 1:
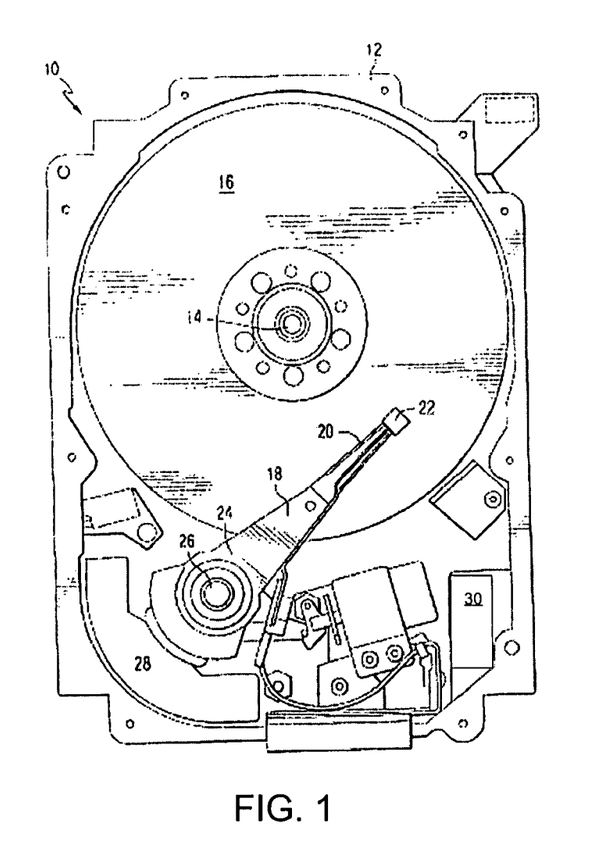
FIG. 1 is a pictorial representation of a disc drive incorporating the inventive magnetic recording medium in accordance with one embodiment of the presenting invention.

FIG. 1 is a pictorial representation of a disc drive 10 that can use fluorine mediated recording medium in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a fluorine mediated magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is regulated by a controller 30, which is well known in the art.

Figure 2:
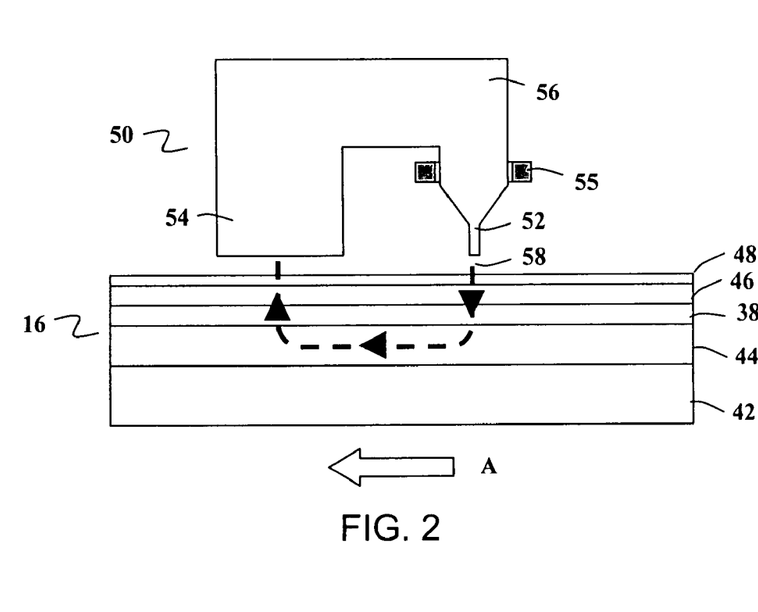
FIG. 2 is a partially schematic side view of a perpendicular recording head and the inventive magnetic medium in accordance with one embodiment of the present invention.

FIG. 2 is a partial schematic side view of a perpendicular recording head 50 and a magnetic recording medium 16 having a composite magnetic recording structure in accordance with one embodiment of the present invention. The recording head 50 may include a writer section comprising a main write pole 52 and a return pole 54 that are magnetically coupled by a yoke 56. The magnetization coil 55 surrounds the write pole 52 for energizing the recording head 50. It will be appreciated that the recording head 50 may be constructed with a write pole 52 only and no return pole 54 or yoke 56 and that the magnetization coil 55 may surround the yoke 56 instead of the write pole 52. The recording head 50 also may include a read head, not shown, which may be any conventional type read head as is generally known in the art. The magnetic recording medium 16 is positioned adjacent to or under the recording head 50 and travels in the direction of the arrow A. An air bearing surface (not shown) separates the recording head 50 from the medium 16 by a small distance.

The medium 16 is schematically represented as having a laminated structure, including a substrate 42, a soft magnetic underlayer 44, a doped interlayer 38, a hard magnetic recording layer 46 and a protective overcoat 48. In the illustrated embodiment, the aforementioned layers are stacked (e.g., by deposition or dip-coating) in the sequence shown in FIG. 2. However, it is contemplated that to the extent it is consistent with the features, functions and purpose of the present invention disclosed herein, (a) the various layers may be stacked in a different sequence not shown (b) intermediate layer or layers of materials (e.g., a buffer layer, a seed layer, an adhesion layer) may be present or provided between the layers mentioned (it is noted that the reference herein to one layer being above, below, on, or under another layer does not necessarily mean immediately above, below, on, or under, and does not preclude the addition of intermediate layer or layers); (c) certain layer or layers may be omitted or replaced by other equivalent or different layer or layers of material; (d) one or more of the layer structures may include a multilayered structure and/or sub-layers of same or different materials; (e) one or more of the layer structures shown need not be of a continuous structure (e.g., a bit patterned or etched layer); and (f) one or more of the layers need not be of uniform thickness (e.g., a planarized or mechanically textured layer of magnetic material). Other variations may be implemented without departing from the scope and spirit of the present invention.

FIG. 2 also shows the magnetic flux 58 passing through the fluorine mediated magnetic medium 16 during a recording operation. During the recording operation, the recording medium 16 is passed under the recording head 50 in the direction indicated by arrow A. A current is applied to the magnetization coil 55, which induces a magnetic flux 58 that is directed from the write pole 52 through the hard recording layer 46 and the interlayer 38, then back to the opposing pole 54. The soft underlayer 44 provides a flux path, which directs the magnetic flux 58 back to the opposing pole 54.

The substrate 42 shown in FIG. 2 may be made of any suitable material for hard discs, such as rigid materials including ceramic glass, amorphous glass, Al or NiP plated AlMg. For floppy discs and magnetic tape applications, suitable flexible materials may be used for the substrate 42. The soft magnetic underlayer 44 may be made of any suitable material such as, for example, alloys or multilayers comprising Co, Fe, Ni, Pd, Pt or Ru, such as CoFe, FeAlN, NiFe, CoZrNb, CoNiFe, FeTaN. The soft underlayer 44 may be made of the same or different materials and may consist of one or multiple soft underlayers.

In one embodiment of the present invention, the doped interlayer 38 is made up of a thin fluorinated carbon film that is deposited on top of the soft underlayer 44. The carbon is used for the structural matrix and the fluorine (electronegativity [Pauling]=3.98) is used as the dopant. Known processes (e.g. physical vapor deposition, chemical vapor deposition and pulsed laser deposition) may be used to deposit the doped interlayer 38 materials because the materials remain as monomers after deposition. In one embodiment, the fluorine to carbon concentration remains below about 40%, and more preferable between 5% to 20% depending on the final film thickness. The thickness of the deposited interlayer 38 should be below 10 nm, for example, below 5 mn to maximize the efficiency of the magnetic flux 58.

Another important parameter is the surface roughness of the interlayer 38, which should be kept at a root-mean-square (RMS) below 20% of the magnetic nanoparticle size, for example, below 10% of the typical magnetic nanoparticle size. If the FePt nanoparticles have a typical diameter of 10 nm, the surface roughness of the interlayer 38 should be maintained at an RMS of 1 nm or less. The carbon and fluorine materials may come from two different targets used in the deposition chamber (not shown) or they may come from a single target comprising fluorine and carbon materials.

In another embodiment of the present invention, the matrix material of the doped interlayer 38 is a polymeric material. For example, PMMA (Poly methyl methacrylate), or PVC-PMMA polymer blend compositions may be deposited using known processes to form an interlayer. The dopant may be introduced during the deposition of the polymeric matrix material for example, through the use of a doped target in a sputtering process. Alternatively, the dopant may be subsequently added to the polymeric matrix layer for example, by dip coating the substrate or through heat activated diffusion.

Yet in another embodiment of the present invention, the dopant material used in the interlayer 38 is a non-fluorine element with high electronegativity. For example, other halogens such as chlorine (electronegativity [Pauling]=3.16), bromine ([Pauling]2.96) and iodine ([Pauling] 2.66) may be used as the dopant material. In addition, non-halogen elements with high electronegativity may also be used as an alternative dopant material. It is anticipated that alternate dopant elements such as oxygen ([Pauling] 3.44) and sulfur ([Pauling] 2.58) and may also be used without deviating from the scope and spirit of the invention.

A number of different nanoparticle materials can be candidates for the recording layer 46. Some of these materials include nanoparticles made of FePd, FePt, CoPt, Co and MnAl. While the inventive process set forth herein is described using FePt nanoparticles, any of the previously mentioned materials maybe used for the nanoparticles without departing from the spirit and scope of the present invention.

FePt alloys are an important class of materials in permanent magnetic applications because of their extremely large $K_u$ of $7\times10^6$ J/m$^3$ and good chemical stability. As the magnetic stability of the individual particles scale with the anisotropy $K_u$ and particle volume V, FePt nanoparticles become a suitable candidate for the recording layer 46 in ultra-high density magnetic recording apparatuses 10.

Chemically disordered FePt nanoparticles are synthesized using a known method based on the decomposition of iron pentacarbonyl and the reduction of platinum acetylacetonate. Also using a known process, an ultra thin layer of FePt nanoparticles may be deposited on top of the doped interlayer 38 to form the recording layer 46. This layer is deposited by dip-coating the substrate 42 in a solution containing FePt nanoparticles, a non-polar solvent and an excess surfactant, then pulling the substrate 42 out of the solution at a constant speed. The non-polar solvent is then evaporated with care to avoid the solution from de-wetting and forming non-uniform layers of nanoparticles. Surfactants such as oleic acid and oleyl amine aid the FePt nanoparticles in diffusing across the surface to form the self-assembled monolayers. In addition, the surfactant molecules prevent agglomeration of the nanoparticles and are a significant factor in defining and limiting the distance between adjacent nanoparticles. The deposition of nanoparticles can be accomplished by other techniques besides dip-coating including, but not limited to, thin film coating techniques such as spin cast coating, soaking coating, etc.

In the embodiment illustrated in FIG. 2, the recording medium 16 may further comprise a hard protective layer 48. The protective overcoat 48 may include a diamond-like carbon layer. In addition to carbon, the protective layers 48 may include CH, CN, CHN, CH/CF, AlN, CiN, BN, etc., and also other films like MgO, $Al_2O_3$, TiN, TiC, etc. The protective layer 48 may be formed by a sputtering method or a CVD method. Further, a lubricant layer (not show) may be formed on the protective layer 48.

Figure 3:
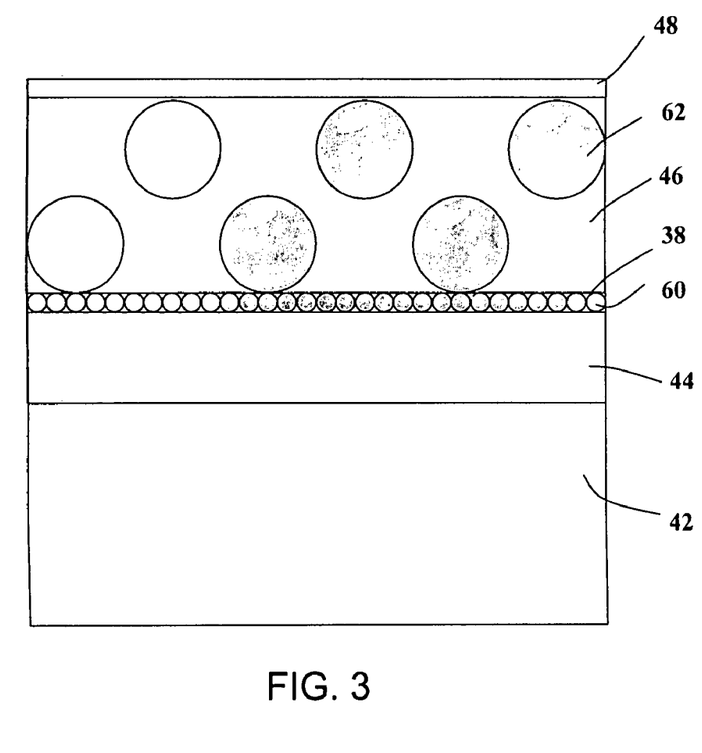
FIG. 3 is a partially schematic sectional view of the recording medium in accordance with one embodiment of the present invention.

FIG. 3 is a partially schematic sectional view of the recording media showing the relative position of the FePt nanoparticles 62 and the fluorine atoms 60 according to an embodiment of the present invention. The fluorine atoms 60 are distributed throughout the interlayer 38 at an areal density of approximately one fluorine atom per nm$^2$. For a FePt nanoparticle 62 that has a diameter of approximately 5 nm, there will be approximately 25 fluorine atoms 60 available to maintain adequate chemical bonding of the nanoparticle 62 to the interlayer 38. Subsequently, for a FePt nanoparticle 62 that has a diameter of approximately 15 nm, there will be approximately 125 fluorine atoms 60 available to hold the nanoparticle 62 in place.

Self-assembled nanoparticles 62 behave like atoms inside a crystal such that they arrange themselves in a lattice. By securing these lattices in place, the spatial uniformity and ordered arrays of the nanoparticles 62 are preserved even after subsequent processing steps such as annealing. It has been found through experimentation that when FePt nanoparticles 62 are deposited on a doped interlayer 38 through a dip-coating process, the nanoparticles 62 self-assemble and form ordered monolayers that remain stable during the subsequent annealing process. The monolayers of FePt nanoparticles remain as uniform self-assembled ordered arrays across the substrate surface in length scales on the order of ten millimeters as proven by experimentation, compared to the length scales of several micrometers in the prior art. It is anticipated that larger length scales on the order of several centimeters may be achieved in accordance with the present invention.

When the FePt nanoparticles 62 are deposited on an undoped surface, they tend to form bilayers and multilayers that suffer from sintering damage during the subsequent annealing process. It is theorized that the fluorinated interlayer 38 mediates a strong chemical bonding of the nanoparticles 62 to the substrate 42 leading to homogeneous monolayers formation and preventing particle motion during the subsequent annealing process. It is also theorized that the diffusion properties of the colloidal solution are controlled by the fluorinated interlayer 38, and thus, promote the ordered self-assembly in the homogenous monolayer.

Figure 4:
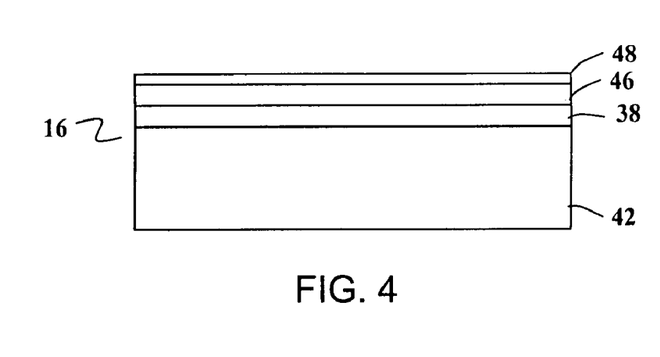
FIG. 4 is a partially schematic sectional view of the inventive recording medium without a soft underlayer in accordance with an embodiment of the present invention.

FIG. 4 is a partially schematic sectional view showing the composite recording medium 16 according to another embodiment of the present invention. Although some of the embodiments of the present invention use a soft underlayer 44 to provide a flux path for the recording head 50, it can be appreciated by one skilled in the art that the magnetic recording medium 16 may be constructed without a soft underlayer 44 and not depart from the scope and spirit of the present invention. For example, the recording apparatus 10 may use longitudinal recording instead of perpendicular recording where the recording head 50 is a ring type and emits a magnetic flux 58 to align the individual grains to form packets or data. The recording layer 46 provides the flux path for the magnetic flux 58, which negates the need for a soft underlayer 44. Therefore, an embodiment of the present invention may not include a soft underlayer 44. Instead, it may be comprised of a substrate 42, a doped interlayer 38, a recording layer 46 and a protective overcoat 48 as depicted in FIG. 4.

Figure 5:
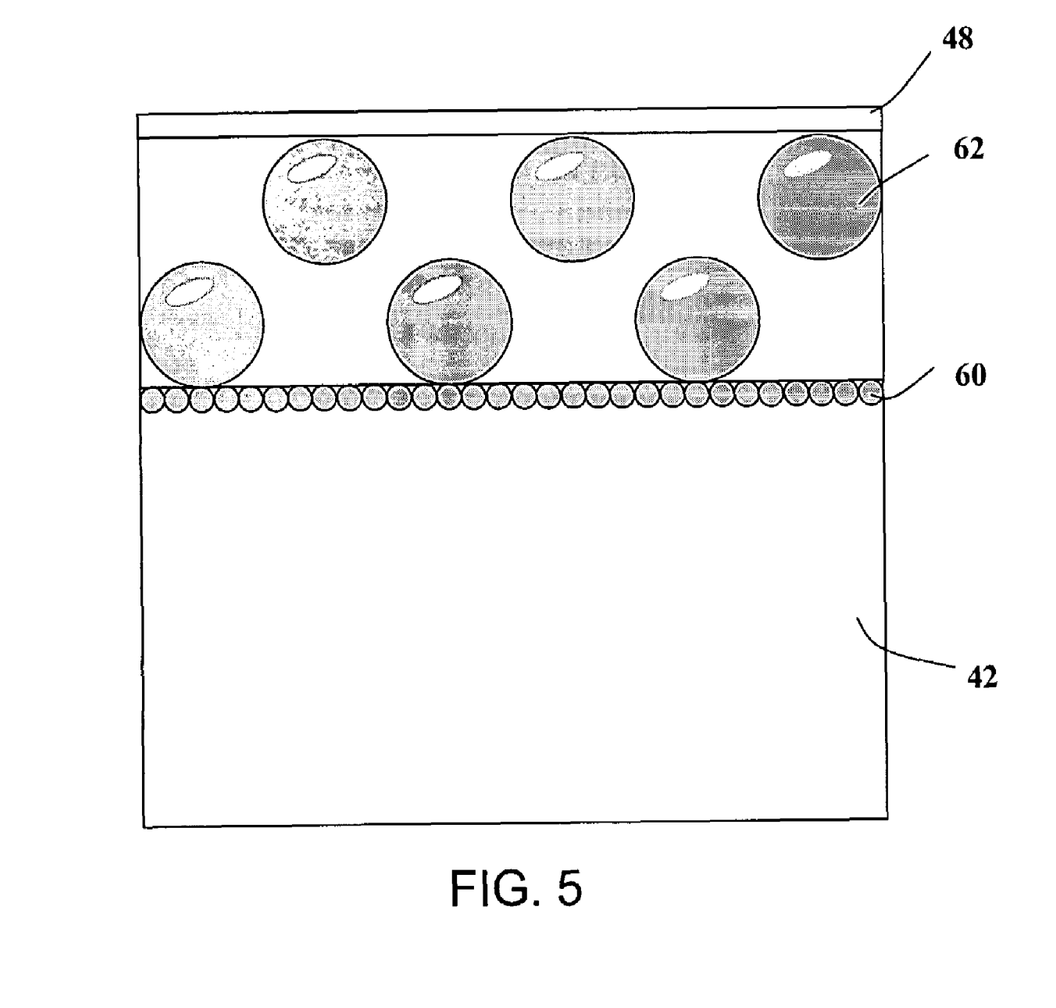
FIG. 5 is a partially schematic sectional view or the recording medium without an interlayer in accordance with an embodiment of the present invention.

Even though some of the embodiments of the present invention use a matrix material to hold the dopant atoms in place in the interlayer 38, it can be appreciated that an additional matrix material may not be needed in order to mediate the organized monolayers of magnetic nanoparticles 62. As shown in FIG. 5, the surface of the substrate 42 may be doped with fluorine atoms 60 to create an attractive surface for the nanoparticles 62. The fluorine atoms 60 can be volatilized, ionized, accelerated and directed toward the substrate 42 using known processes such as low-temperature ion implantation. The fluorine atoms 60 enter the crystal lattice of the substrate 42, collide with the host atoms, lose energy and finally stop at a depth within the substrate 42. The doped substrate 42 may go through a subsequent annealing process to repair lattice damage and place dopant fluorine atoms 60 in the appropriate lattice locations.

Although some of the embodiments of the present invention use FePt nanoparticles 62 in the recording layers 46, other suitable materials for the recording layer 46 may be used instead. Alternative recording layer materials may include nanoparticles comprising of other ferromagnetic particles with a diameter of less than 15 nm, and consisting of materials such as Co, Fe, Ni, Mn, Sm, Nd, Pr, Pt, Gd, C, B, Zr, and alloys of the said elements that may include FePd, CoPt and CoPd. Suitable dopants should be selected to match the material of the nanoparticles to ensure proper ordered array formations. For example, halogens such as fluorine, chlorine, bromine or iodine may be used as the dopant material. In addition, non-halogen elements with high electronegativity such as oxygen and sulfur and may be used without deviating from the scope and spirit of the invention.

The relative thicknesses of the interlayer 38 and the recording layer 46 and the choice of materials for these layers may be selected to obtain the necessary magnetization properties (documented below) in relation to the operating magnetic field of the recording head 50 and the recording density to be achieved. Further consideration may be given to the thickness and choice of substrate 42.

By way of example and not limitation, for perpendicular recording in the hard disc drive 10 that uses a fluorinated recording medium 16 designed to achieve a data recording density on the order of 1 to 10 Terabits/cm$^2$, having a recording layer with monodispersive particles of 4nm diameter, operating at 7.5 to 15 rpm and a recording head magnetic field strength on the order of 10 kOe (e.g., heat assisted magnetic recording) or higher, the materials for the various layers and the thicknesses thereof for various embodiments are set forth below:

| Substrate | Material | Typical Thickness Range |
|---|---|---|
| Soft Underlayer | CoNiFe | 50 nm to 80 nm |
| Interlayer | Fluorinated carbon | 1 to 5 nm |
| Magnetic MonoLayer | FePt nanoparticles | 4 to 15 nm |
| Protective Overcoat | Carbon | 0.5 nm to 15 nm |

The various layers of the recording medium 16 may be formed by known conventional process steps, such as sputtering, deposition, coating, etc., which may also include the steps of polishing, prepping, heat treatment (e.g., annealing), sintering, etching, lithographic masking, etc.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A magnetic recording medium comprising:
   a substrate;
   an interlayer supported on the substrate, the interlayer comprising a carbon material doped with a halogen material; and
   a magnetic recording layer on the interlayer, the magnetic recording layer comprising an array of ferromagnetic nanoparticles.

2. The magnetic recording medium of claim 1, wherein the interlayer comprises a fluorinated carbon material.

3. The magnetic recording medium of claim 2, wherein the array of ferromagnetic nanoparticles comprises a monolayer of nanoparticles in physical contact with the fluorinated doped material.

4. The magnetic recording medium of claim 2, wherein the fluorinated carbon material comprises a fluorine to carbon concentration below about 40%.

5. The magnetic recording medium of claim 4, wherein the fluorine to carbon concentration is 5% to 20%.

6. The magnetic recording medium of claim 2, further comprising:
   a soft underlayer disposed between the substrate and the interlayer;
   a protective overcoat on the array of ferromagnetic nanoparticles;

wherein the soft underlayer comprises CoNiFe;
wherein the ferromagnetic nanoparticles comprise FePt nanoparticles; and
wherein the protective overcoat comprises carbon.

7. The magnetic recording medium of claim 1, wherein the halogen material comprises chlorine.

8. The magnetic recording medium of claim 1, wherein the halogen material comprises bromine.

9. The magnetic recording medium of claim 1, wherein the halogen material comprises iodine.

10. A method of making a magnetic recording medium, the method comprising:

providing a substrate;

forming an interlayer supported on the substrate, said interlayer comprising a carbon material doped with a halogen material; and forming a magnetic recording layer on the interlayer, the magnetic recording layer comprising an away of ferromagnetic nanoparticles.

11. The magnetic recording medium of claim 10, wherein the halogen material comprises fluorine.

* * * * *

UNITED STATES PATENT AND TRADEMARK OFFICE
CERTIFICATE OF CORRECTION

| | | |
|---|---|---|
| PATENT NO. | : 7,638,211 B2 | Page 1 of 1 |
| APPLICATION NO. | : 11/055004 | |
| DATED | : December 29, 2009 | |
| INVENTOR(S) | : Ahner et al. | |

It is certified that error appears in the above-identified patent and that said Letters Patent is hereby corrected as shown below:

Column 10, line 7, "comprising an away" should be changed to --comprising an array--

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,638,211 B2  Page 1 of 1
APPLICATION NO. : 11/055004
DATED : December 29, 2009
INVENTOR(S) : Ahner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

Ninth Day of November, 2010

David J. Kappos
*Director of the United States Patent and Trademark Office*